(12) United States Patent
Ahn et al.

(10) Patent No.: US 12,362,602 B2
(45) Date of Patent: Jul. 15, 2025

(54) WIRELESS POWER TRANSMISSION SYSTEM

(71) Applicant: Korea Advanced Institute of Science and Technology, Daejeon (KR)

(72) Inventors: Seung Young Ahn, Daejeon (KR); Bom Son Lee, Gyeonggi-do (KR); Chang Min Lee, Daejeon (KR); Seong Ho Woo, Daejeon (KR); Yu Jun Shin, Daejeon (KR); Jae Won Rhee, Daejeon (KR); Dong Ryul Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 16 days.

(21) Appl. No.: 18/411,178

(22) Filed: Jan. 12, 2024

(65) Prior Publication Data

US 2024/0243616 A1 Jul. 18, 2024

(30) Foreign Application Priority Data

Jan. 13, 2023 (KR) .......................... 10-2023-0005498

(51) Int. Cl.
  *H02J 50/70* (2016.01)
  *H02J 50/12* (2016.01)
  *H02J 50/40* (2016.01)

(52) U.S. Cl.
  CPC .............. *H02J 50/70* (2016.02); *H02J 50/12* (2016.02); *H02J 50/402* (2020.01)

(58) Field of Classification Search
  CPC .......... H02J 50/70; H02J 50/12; H02J 50/402; H01F 27/345
  See application file for complete search history.

(56) References Cited

U.S. PATENT DOCUMENTS 10,081,263 B2 * 9/2018 Kim ................. B64U 50/38
2018/0056794 A1 * 3/2018 Kim ................. B60L 53/126
(Continued)

FOREIGN PATENT DOCUMENTS

| KR | 20190081737 A | 7/2019 |
| KR | 10-2019-0138052 A | 12/2019 |
| KR | 20220154156 A | 11/2022 |

OTHER PUBLICATIONS

Changmin Lee et al., "EMI Reduction Method for Wireless Power Transfer Systems With High Power Transfer Efficiency Using Frequency Split Phenomena", IEEE Transactions on Electromagnetic Compatibility, vol. 64, No. 5, Aug. 23, 2022.

(Continued)

*Primary Examiner* — Jared Fureman
*Assistant Examiner* — Michael J Warmflash
(74) *Attorney, Agent, or Firm* — Sughrue Mion, PLLC

(57) ABSTRACT

Disclosed is a wireless power transmission system including a first circuit comprising a transmitting coil for transmitting power; and a second circuit comprising a shielded coil, wherein, in the transmitting coil and the shielded coil, frequency division wherein an impedance magnitude of the second circuit is minimized at a first frequency smaller than a resonant frequency of the second circuit and a second frequency larger than the resonant frequency of the second circuit occurs, and inductive coupling wherein the first frequency is larger than a fundamental frequency of the first circuit and the second frequency is smaller than a third high frequency of the second circuit.

16 Claims, 5 Drawing Sheets

(56) References Cited

U.S. PATENT DOCUMENTS

2019/0081737 A1* 3/2019 Huang ................. H04L 1/0026
2021/0044150 A1* 2/2021 Tang ....................... H01F 27/28
2021/0281122 A1* 9/2021 Aldhaher ............... H02J 50/50

OTHER PUBLICATIONS

Jaehyoung Park et al; Planar multiresonance reactive shield for reducing electromagnetic interference in portable wireless power charging application. Appl. Phys. Lett. May 20, 2019; 114 (20): 203902.

Office action for corresponding Korean Application No. 10-2023-0005498 dated May 22, 2024.

* cited by examiner

1000

WIRELESS POWER TRANSMISSION SYSTEM

CROSS-REFERENCE TO RELATED APPLICATION

This application claims priority to Korean Patent Application No. 10-2023-0005498, filed on Jan. 13, 2023 in the Korean Intellectual Property Office, the disclosure of which is incorporated herein by reference.

TECHNICAL FIELD

The present disclosure relates to a wireless power transmission system. This work was supported by the National Research Foundation of Korea (NRF) grant funded by the Korean government (MSIP)(2017R1A5A1015596). This work was supported in part by the Institute of Information and Communications Technology Planning and Evaluation (IITP) Grant (Development of Advanced Power and Signal EMC Technologies for Hyperconnected E-Vehicle) funded by the Korean Government (MSIT) under Grant 2020-0-00839. And this work was supported by Institute of Information & communications Technology Planning & Evaluation (IITP) grant funded by the Korea government (MSIT) (No.2022-0-00986, Development of artificial intelligence-based base station electromagnetic wave human exposure prediction algorithm)

BACKGROUND

As methods of supplying power to electronic devices such as mobile phones and electric vehicles, there are a wired power supply method of suppling power by connecting a physical cable or wire to a commercial power source and electronic devices; and a wireless power supply method that does not require physical cables or wires by using inductive coupling wherein current in the second coil is induced by current flowing in the first coil.

Recently, the demand for a wireless power supply method has increased in the mobile phone and electric vehicle fields, so the wireless power supply method needs to improve power transmission efficiency and safety issues due to leakage magnetic fields.

RELATED ART DOCUMENT

Korean Patent Application Publication No. 10-2019-0138052, titled "WIRELESS POWER SYSTEM."

BRIEF SUMMARY

Therefore, the present disclosure has been made in view of the above problems, and it is an object of the present disclosure to provide a wireless power transmission system with improved efficiency and safety.

It is another object of the present disclosure to provide a wireless power transmission system including a shielded coil.

It is still another object of the present disclosure to provide a wireless power transmission system using frequency division.

It is yet another object of the present disclosure to provide a wireless power transmission system capable of increasing power transmission efficiency at a fundamental frequency and offsetting a leakage magnetic field at a higher frequency.

In accordance with an aspect of the present disclosure, the above and other objects can be accomplished by the provision of a wireless power transmission device, including: a first circuit including a transmitting coil for transmitting power; and a second circuit including a shielded coil, wherein, in the transmitting coil and the shielded coil, frequency division wherein an impedance magnitude of the second circuit is minimized at a first frequency smaller than a resonant frequency of the second circuit and a second frequency larger than the resonant frequency of the second circuit occurs, and inductive coupling wherein the first frequency is larger than a fundamental frequency of the first circuit and the second frequency is smaller than a third high frequency of the second circuit.

In an embodiment, the first frequency may be $$\frac{\omega_{SH}}{\sqrt{1+k}},$$

where $\omega_{SH}$ represents the resonant frequency of the second circuit, and k represents a coupling coefficient of the transmitting coil and the shielded coil.

In an embodiment at the first frequency, the impedance of the second circuit may be a capacitive impedance.

In an embodiment, the first frequency component of the second circuit may increase power transmission efficiency of the first circuit.

In an embodiment, the second frequency may be $$\frac{\omega_{SH}}{\sqrt{1+k}},$$

where $\omega_{SH}$ represents the resonant frequency of the second circuit, and k represents a coupling coefficient of the transmitting coil and the shielded coil.

In an embodiment, the impedance of the second circuit at the second frequency may be an inductive impedance.

In an embodiment, the second frequency component of the second circuit may offset a leakage magnetic field of the first circuit.

In an embodiment, a coupling coefficient of the transmitting coil and the shielded coil may be greater than a threshold, at which frequency division occurs, and smaller than 8.

In an embodiment, the threshold at which the frequency division occurs may be $$\frac{1}{\sqrt{Q_{TX}Q_{SH}}},$$

where $Q_{TX}$ represents Q factor of the first circuit, and $Q_{SH}$ represents Q factor of the second circuit.

In accordance with another aspect of the present disclosure, provided is a wireless power transmission device, including: a first circuit including a transmitting coil for transmitting power; and a second circuit including a shielded coil, wherein, in the transmitting coil and the shielded coil, coupling coefficient k forms an inductive coupling having a range of $k_{critical} < k$, where $k_{critical}$ is a critical coupling coefficient at which a frequency division phenomenon occurs.

BRIEF DESCRIPTION OF THE DRAWINGS

The above and other objects, features and other advantages of the present disclosure will be more clearly understood from the following detailed description taken in conjunction with the accompanying drawings, in which:

FIGS. 2 and 3 are drawings for explaining an existing wireless power transmission system applied to a robot arm according to an embodiment of the present disclosure; and FIGS. 3 to 5 are drawings for explaining a wireless power transmission system according to an embodiment of the present disclosure.

DETAILED DESCRIPTION

Figure 1:
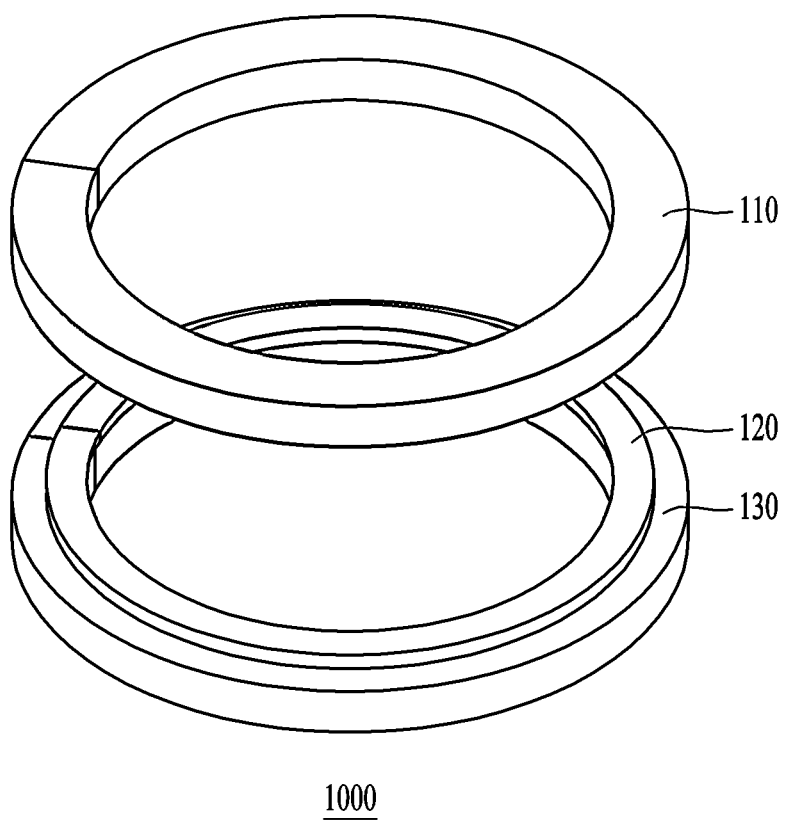
FIGS. 1 and 2 are drawings for explaining the structure of a wireless power transmission system according to an embodiment of the present disclosure.

The present disclosure will now be described more fully with reference to the accompanying drawings, in which exemplary embodiments of the disclosure are shown.

This disclosure, however, should not be construed as limited to the exemplary embodiments and terms used in the exemplary embodiments, and should be understood as including various modifications, equivalents, and substituents of the exemplary embodiments.

In the description of embodiments of the present disclosure, certain detailed explanations of related known functions or constructions are omitted when it is deemed that they may unnecessarily obscure the essence of the disclosure.

In addition, the terms used in the specification are defined in consideration of functions used in the present disclosure, and can be changed according to the intent or conventionally used methods of clients, operators, and users. Accordingly, definitions of the terms should be understood on the basis of the entire description of the present specification.

In the drawings, like reference numerals in the drawings denote like elements.

As used herein, the singular forms "a," "an" and "the" are intended to include the plural forms as well, unless context clearly indicates otherwise.

Expressions such as "A or B" and "at least one of A and/or B" should be understood to include all possible combinations of listed items.

Expressions such as "a first," "the first," "a second" and "the second" may qualify corresponding components irrespective of order or importance and may be only used to distinguish one component from another component without being limited to the corresponding components.

In the case in which a (e.g., first) component is referred as "(functionally or communicatively) connected" or "attached" to another (e.g., second) component, the first component may be directly connected to the second component or may be connected to the second component via another component (e.g., third component).

In the specification, the expression " . . . configured to . . . (or set to)" may be used interchangeably, for example, with expressions, such as " . . . suitable for . . . ," " . . . having ability to . . . ," " . . . modified to . . . ," " . . . manufactured to . . . ," " . . . enabling to . . . ," or " . . . designed to . . . ," in the case of hardware or software depending upon situations.

In any situation, the expression "a device configured to" may refer to a device configured to operate "with another device or component."

For examples, the expression "a processor configured (or set) to execute A, B, and C" may refer to a specific processor performing a corresponding operation (e.g., embedded processor), or a general-purpose processor (e.g., CPU or application processor) executing one or more software programs stored in a memory device to perform corresponding operations.

In addition, the expression "or" means "inclusive or" rather than "exclusive or".

That is, unless otherwise mentioned or clearly inferred from context, the expression "x uses a or b" means any one of natural inclusive permutations.

Hereinafter, the terms, such as 'unit' or 'module', etc., should be understood as a unit that processes at least one function or operation and that may be embodied in a hardware manner, a software manner, or a combination of the hardware manner and the software manner.

Figure 2:
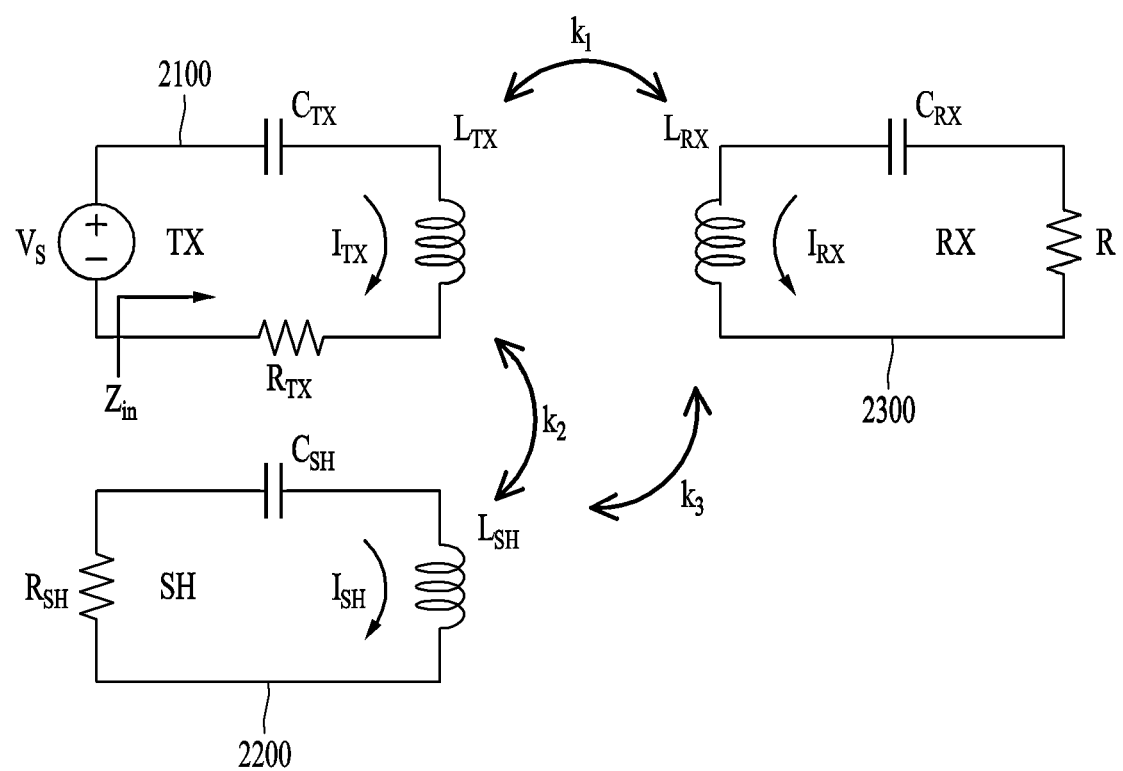

FIGS. 1 and 2 are drawings for explaining a wireless power transmission system according to an embodiment of the present disclosure.

Referring to FIG. 1, a wireless power transmission system 1000 including the shielded coil (SH coil) 120 may include a transmitting coil (TX coil) 130 for transmitting wireless power, a receiving coil (RX coil) 110 for receiving power from the transmitting coil 130 and the shielded coil 120 for offsetting a leakage magnetic field.

Referring to FIG. 2, the wireless power transmission system 1000 may include a first circuit 2100 including the transmitting coil (TX coil), a second circuit 2200 including the shielded coil (SH coil), and a third circuit 2300 including the receiving coil (RX coil).

The transmitting coil (TX coil) of the first circuit 2100 and the receiving coil (RX coil) of the third circuit 2300 may form an inductive coupling according to the inductive coupling coefficient $k_1$, the transmitting coil (TX coil) of the first circuit 2100 and the shielded coil (SH coil) of a second circuit may form an inductive coupling according to the inductive coupling coefficient $k_2$, and the receiving coil (RX coil) of the third circuit 2300 and the shielded coil (SH coil) of the second circuit 2200 form an inductive coupling according to the inductive coupling coefficient $k_3$. Here, the inductive coupling coefficient $k_2$ of the transmitting coil (TX coil) of the first circuit 2100 and the shielded coil (SH coil) of the second circuit 2200 may be set to be greater than critical coupling coefficient $k_{critical}$, at which frequency division occurs, and less than 0.8 as shown in the following Equation 1:

$$k_{critical} < k_2 < 0.8 \qquad \text{[Equation 1]}$$

where critical coupling coefficient $k_{critical}$ is $$\frac{1}{\sqrt{Q_{TX}Q_{SH}}},$$

$Q_{TX}$ represents the Q factor of the first circuit 2100, and $Q_{SH}$ represents the Q factor of the second circuit 2200.

Hereinafter, the improvement effect in wireless power transmission efficiency according to inductive coupling formation according to the above Equation 1 according to the inductive coupling coefficient $k_2$ of the transmitting coil (TX coil) of the first circuit 2100 and the shielded coil (SH coil) of the second circuit 2200 is described with reference to FIGS. 3 to 5.

Figure 3:
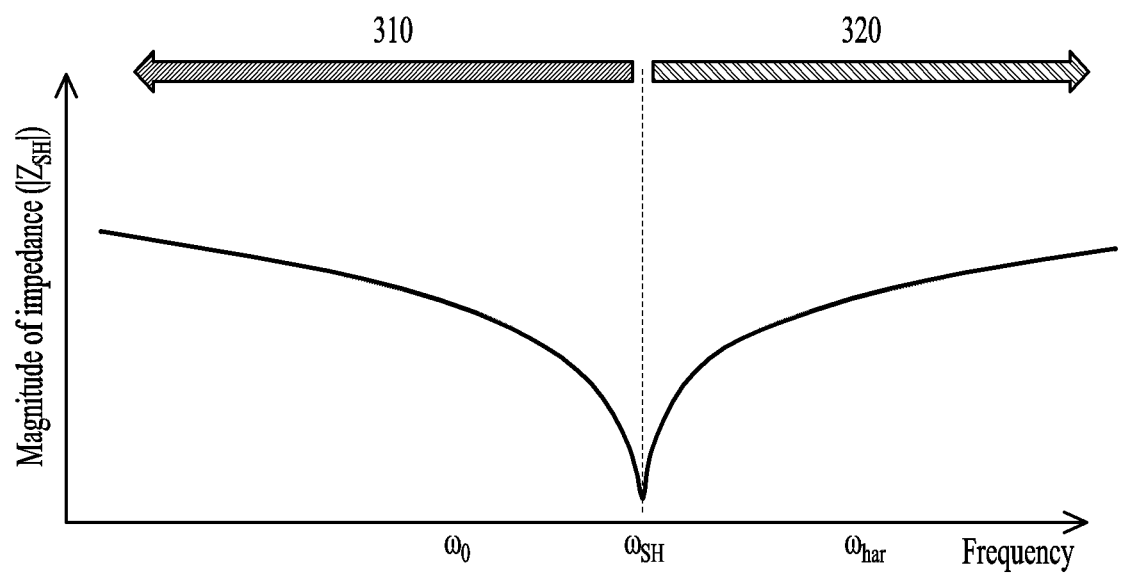
Figure 4:
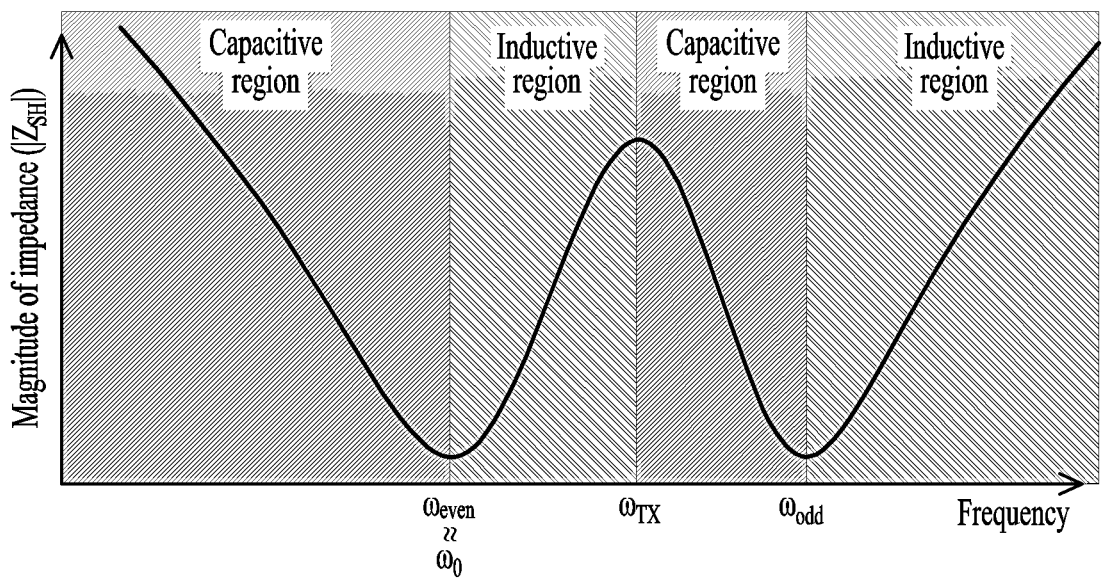
Figure 5:
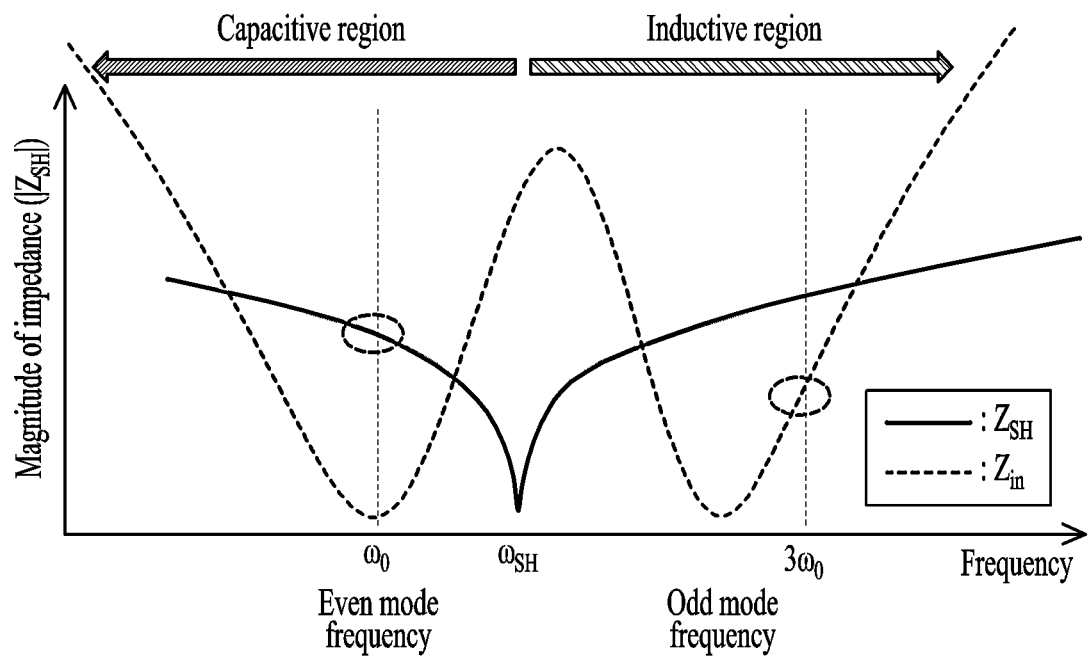

FIGS. 3 to 5 are drawings for explaining a wireless power transmission system according to an embodiment of the present disclosure.

Referring to FIG. 3, when the inductive coupling coefficient between the transmitting coil (TX coil) of the first circuit 2100 and the shielded coil (SH coil) of the second circuit 2200 is set to be smaller than the critical coupling coefficient $k_{critical}$, the magnitude of the impedance ($Z_{SH}$) of the second circuit 2200 including the shielded coil (SH coil) according to the frequency of the second circuit 2200 including the shielded coil (SH coil) is illustrated. It can be confirmed that the impedance of the first circuit 2100 including the shielded coil (SH coil) is minimized at the resonant frequency of a circuit including the shielded coil (SH coil).

In FIG. 3, 310 represents a capacitive region and 320 represents an inductive region.

Referring to FIG. 4, when the inductive coupling coefficient between the transmitting coil (TX coil) of the first circuit 2100 and the shielded coil (SH coil) of the second circuit 2200 is set to be smaller than critical coupling coefficient $k_{critical}$, the magnitude of the impedance ($Z_{SH}$) of the second circuit 2200 including the shielded coil (SH coil) according to the frequency of the second circuit 2200 including the shielded coil (SH coil) is illustrated. Here, the frequency division phenomenon that the impedance of the second circuit 2200 is minimized at a frequency (hereinafter referred to as "first frequency") smaller than the resonant frequency of the second circuit 2200 and at a frequency (hereinafter referred to as "second frequency") larger than the resonant frequency of the second circuit 2200 occurs.

Conventionally, a shielded coil (SH coil) has been used to increase the efficiency of wireless power transmission and block a leakage magnetic field. However, the efficiency of wireless power transmission was actually lowered when the frequency division phenomenon occurred as shown in FIG. 4, so the coupling coefficient of the transmitting coil (TX coil) of the first circuit 2100 and the shielded coil (SH coil) of the second circuit 2200 was set to be smaller than the critical coupling coefficient $k_{critical}$.

FIG. 5 illustrates the magnitude of the impedance ($Z_{SH}$) of the second circuit 2200 including the shielded coil (SH coil) according to the frequency of the second circuit 2200 including the shielded coil (SH coil) when the inductive coupling coefficient between the transmitting coil (TX coil) of the first circuit 2100 and the shielded coil (SH coil) of the second circuit 2200 is set as in the above Equation 1. It can be confirmed that the frequency division phenomenon occurs because the inductive coupling coefficient between the transmitting coil (TX coil) of the first circuit 2100 and the shielded coil (SH coil) of the second circuit 2200 is larger than the magnitude of the critical coupling coefficient $k_{critical}$. Here, the magnitude of the impedance ($Z_{SH}$) of the second circuit 2200 including the shielded coil (SH coil) according to the frequency of the second circuit 2200 including the shielded coil (SH coil) is minimized at each of the first frequency $$\frac{\omega_{SH}}{\sqrt{1+k_2}}$$

and the second frequency $$\frac{\omega_{SH}}{\sqrt{1+k}}.$$

The magnitude of impedance ($Z_{SH}$) of the second circuit 2200 including the shielded coil (SH coil) shows capacitive impedance characteristics at a frequency smaller than the first frequency $$\frac{\omega_{SH}}{\sqrt{1+k_2}}.$$

In this region, the direction of current flowing in the shielded coil (SH coil) included in the second circuit 2200 and the direction of current flowing in the transmitting coil of the first circuit 2100 are in the same direction, so the power transmission efficiency may be increased. In addition, the magnitude of the impedance ($Z_{SH}$) of the second circuit 2200 including the shielded coil (SH coil) shows inductive impedance characteristics at a frequency smaller than the second frequency $$\frac{\omega_{SH}}{\sqrt{1-k}}.$$

In this region, the direction of current flowing in the shielded coil (SH coil) included in the second circuit 2200 is opposite to the direction of current flowing in the transmitting coil of the first circuit 2100, so the magnetic field of the transmitting coil (TX coil) of the first circuit 2100 may be offset.

Accordingly, the wireless power transmission system 1000 according to the present disclosure may increase the efficiency of wireless power transmission by setting the inductive coupling coefficient between the transmitting coil (TX coil) of the first circuit and the shielded coil (SH coil) of the second circuit 2200 as in Equation 1 to match the first frequency $$\frac{\omega_{SH}}{\sqrt{1+k_2}}$$

of the second circuit 2200 with the fundamental frequency at which the first circuit 2100 operates, and may offset the leakage magnetic field generated from a high-frequency component by matching the second frequency $$\frac{\omega_{SH}}{\sqrt{1-k}}$$

of the second circuit 2200 with the high frequency at which the first circuit 2100 operates. Using this principle, the above Equation 1 may be derived according to the following equation:

$$k_{critical} < k_2 \qquad \text{[Equation 2]}$$

Since the wireless power transmission system 1000 according to the present disclosure is premised on the frequency division phenomenon, the inductive coupling coefficient between the transmitting coil (TX coil) of the first circuit and the shielded coil (SH coil) of the second circuit 2200 should be larger than the critical coupling coefficient $k_{critical}$.

$$\frac{\omega_{SH}}{\sqrt{1+k}} > \omega_0 \quad \text{[Equation 3]}$$

where $\omega_{SH}$ represents the resonant frequency of the second circuit 2200, and $\omega_o$ represents the fundamental frequency at which the first circuit 2100 operates.

This is to improve the efficiency of wireless power transmission by matching the first frequency of the second circuit 2200 with the fundamental frequency of the first circuit 2100.

$$\frac{\omega_{SH}}{\sqrt{1-k}} > \omega_{har} \quad \text{[Equation 4]}$$

where $\omega_{SH}$ represents the resonant frequency of the second circuit 2200, and $\omega_{har}$ represents the frequency of the first circuit 2100 represents an odd high frequency (third high frequency, fifth high frequency . . . ) among high-frequency components.

This is to block a leakage magnetic field in the high-frequency component by matching the second frequency of the second circuit 2200 with the odd high frequency of the first circuit 2100.

Meanwhile, the coupling coefficient k forms an inductive coupling having a range of $k_{critical} < k$. Here, it is possible to derive k value capable of maximally offsetting the leakage magnetic field for the first frequency component in the $k_{critical} < k$ range. Here, the k value can be derived through the following Equation 5:

$$\vec{B}_{TX} + \vec{B}_{SH} \propto N_{TX} I_{TX}^{3rd} - N_{SH} I_{SH}^{3rd} = \quad \text{[Equation 5]}$$

$$(N_{TX} I_{TX}^{3rd})\left(\frac{8-(1+9\alpha)k}{8-k}\right) \to k = \frac{8}{1+9\alpha}$$

$$*\alpha = \frac{(D_{outer-TX} - N_{TX}(w_{TX} + p_{TX}))^2}{(16D_{outer-TX} + 28N_{TX}(w_{TX} + p_{TX}))} \times \frac{(16D_{outer-SH} + 28N_{SH}(w_{SH} + p_{SH}))}{(D_{outer-SH} - N_{SH}(w_{SH} + p_{SH}))^2}$$

where $B_{TX}$ represents a magnetic field component caused by a coil that transmits power, $B_{SH}$ represents a magnetic field component generated by a shielded coil, $N_{TX}$ represents the number of turns of a transmitting coil that transmits power, $N_{SH}$ represents the number of turns of the shielded coil, $I_{TX}$ represents current flowing in the transmitting coil, and $I_{SH}$ represents current flowing in the shielded coil. Here, the '$3^{rd}$' represents a third harmonic frequency, WIX represents the wire diameter of the transmitting coil, $P_{TX}$ represents the channel spacing between wires, D_outer-TX represents the entire diameter (e.g., the diameter in the case of a circular coil) of the transmitting coil, and D_outer-SH represent the diameter of the shielded coil. In addition, Equation 5 may use the inductance value when the coil is circular. $\alpha$ is a constant defined based on the coil shape, and in the equation related to $\alpha$, D_outer represents the diameter of the coil, w represents the diameter of the wire, and p represents the channel spacing between two wires.

According to an aspect of the present disclosure, a wireless power transmission system with improved efficiency and safety can be provided.

According to another aspect of the present disclosure, a wireless power transmission system including a shielded coil can be provided.

According to still another aspect of the present disclosure, a wireless power transmission system using frequency division can be provided.

According to yet another aspect of the present disclosure, a wireless power transmission system capable of increasing power transmission efficiency at a fundamental frequency and offsetting the leakage magnetic field at a higher frequency can be provided.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

1000: the wireless power transmission system 2100: the first circuit
2200: the second circuit 2300: the third circuit

What is claimed is:
1. A wireless power transmission device, comprising:
a first circuit comprising a transmitting coil for transmitting power; and
a second circuit comprising a shielded coil,
wherein, in the transmitting coil and the shielded coil, a frequency division wherein an impedance magnitude of the second circuit is minimized at a first frequency smaller than a resonant frequency of the second circuit and a second frequency larger than the resonant frequency of the second circuit occurs, and an inductive coupling wherein the first frequency is larger than a fundamental frequency of the first circuit and the second frequency is smaller than a third high frequency of the second circuit,
wherein a coupling coefficient of the transmitting coil and the shielded coil is greater than a threshold at which frequency division occurs, and
wherein the threshold at which the frequency division occurs is

$$\frac{1}{\sqrt{Q_{TX} Q_{SH}}},$$

where $Q_{TX}$ represents a Q factor of the first circuit, and $Q_{SH}$ represents a Q factor of the second circuit.
2. The wireless power transmission device according to claim 1, wherein the first frequency is $$\frac{\omega_{SH}}{\sqrt{1+k}},$$

where $\omega_{SH}$ represents the resonant frequency of the second circuit, and k represents a coupling coefficient of the transmitting coil and the shielded coil.

3. The wireless power transmission device according to claim 1, wherein, at the first frequency, the impedance of the second circuit is a capacitive impedance.

4. The wireless power transmission device according to claim 1, wherein the first frequency component of the second circuit increases power transmission efficiency of the first circuit.

5. The wireless power transmission device according to claim 1, wherein the second frequency is $$\frac{\omega_{SH}}{\sqrt{1-k}},$$

where $\omega_{SH}$ represents the resonant frequency of the second circuit, and k represents the coupling coefficient of the transmitting coil and the shielded coil.

6. The wireless power transmission device according to claim 1, wherein the impedance of the second circuit at the second frequency is an inductive impedance.

7. The wireless power transmission device according to claim 1, wherein the second frequency component of the second circuit offsets a leakage magnetic field of the first circuit.

8. A wireless power transmission device, comprising:
a first circuit comprising a transmitting coil for transmitting power; and
a second circuit comprising a shielded coil,
wherein, in the transmitting coil and the shielded coil, a coupling coefficient k forms an inductive coupling having a range of $k_{critical} < k$,
where $k_{critical}$ is a critical coupling coefficient at which a frequency division phenomenon occurs,
wherein the critical coupling coefficient at which the frequency division phenomenon occurs is $$\frac{1}{\sqrt{Q_{TX}Q_{SH}}},$$

where $Q_{TX}$ represents a Q factor of the first circuit, and $Q_{SH}$ represents a Q factor of the second circuit.

9. The wireless power transmission device according to claim 8, wherein the transmitting coil and the shielded coil form an inductive coupling such that the frequency division phenomenon occurs, wherein an impedance of the second circuit is minimized at a first frequency smaller than a resonant frequency of the second circuit and a second frequency larger than a resonant frequency of the second circuit.

10. The wireless power transmission device according to claim 9, wherein the first frequency is $$\frac{\omega_{SH}}{\sqrt{1+k}},$$

where $\omega_{SH}$ represents the resonant frequency of the second circuit, and k represents a coupling coefficient of the transmitting coil and the shielded coil.

11. The wireless power transmission device according to claim 9, wherein, at the first frequency, the impedance of the second circuit is a capacitive impedance.

12. The wireless power transmission device according to claim 9, wherein the first frequency component of the second circuit increases power transmission efficiency of the first circuit.

13. The wireless power transmission device according to claim 9, wherein the second frequency is $$\frac{\omega_{SH}}{\sqrt{1-k}},$$

where $\omega_{SH}$ represents the resonant frequency of the second circuit, and k represents a coupling coefficient of the transmitting coil and the shielded coil.

14. The wireless power transmission device according to claim 9, wherein the impedance of the second circuit at the second frequency is an inductive impedance.

15. The wireless power transmission device according to claim 9, wherein the second frequency component of the second circuit offsets a leakage magnetic field of the first circuit.

16. The wireless power transmission device according to claim 8, wherein k value capable of maximally offsetting a leakage magnetic field for a second frequency component in a range of $k_{critical} < k$ is $$k = \frac{8}{1+9\alpha},$$

wherein $\alpha$ is a constant defined based on a coil shape.

* * * * *